United States Patent
Matthews et al.

(10) Patent No.: US 9,632,879 B2
(45) Date of Patent: Apr. 25, 2017

(54) DISK DRIVE REPAIR

(71) Applicant: HEWLETT-PACKARD DEVELOPMENT COMPANY, L.P., Houston, TX (US)

(72) Inventors: Robert D Matthews, Houston, TX (US); Brian Keith Dodge, Houston, TX (US); Hunt Hodge, Houston, TX (US); David Pipho, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 14/492,534

(22) Filed: Sep. 22, 2014

(65) Prior Publication Data

US 2016/0085649 A1 Mar. 24, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1415* (2013.01)

(58) Field of Classification Search
CPC ............. G06F 11/1435; G06F 11/1417; G06F 11/4406; G06F 21/575; G06F 17/30
See application file for complete search history.

(56) References Cited

U.S. PATENT DOCUMENTS

| 5,452,277 | A  | * | 9/1995  | Bajorek   | G06F 1/3215  |
|           |    |   |         |           | 360/69       |
| 5,774,292 | A  | * | 6/1998  | Georgiou  | G06F 1/3221  |
|           |    |   |         |           | 360/63       |
| 5,898,880 | A  | * | 4/1999  | Ryu       | G06F 1/3203  |
|           |    |   |         |           | 713/323      |
| 5,907,859 | A  | * | 5/1999  | Shimada   | G06F 3/0625  |
|           |    |   |         |           | 711/112      |
| 5,983,357 | A  | * | 11/1999 | Sun       | G06F 1/325   |
|           |    |   |         |           | 713/320      |
| 6,711,660 | B1 | * | 3/2004  | Milne     | G06F 9/4406  |
|           |    |   |         |           | 711/173      |
| 6,792,556 | B1 | * | 9/2004  | Dennis    | G06F 9/4401  |
|           |    |   |         |           | 714/36       |
| 7,464,291 | B2 | * | 12/2008 | Nagata    | G06F 11/0727 |
|           |    |   |         |           | 709/251      |
| 7,546,487 | B2 |   | 6/2009  | Marisetty et al. | |
| 7,779,305 | B2 |   | 8/2010  | Zimmer et al. | |
| 8,006,125 | B1 |   | 8/2011  | Meng et al. | |
| 8,301,948 | B2 |   | 10/2012 | Blaum et al. | |

(Continued)

OTHER PUBLICATIONS

Seagate, "Technology Paper", Jul. 1999, Seagate Technology, pp. 1-5.*

(Continued)

*Primary Examiner* — Bryce Bonzo
*Assistant Examiner* — Jeison C Arcos
(74) *Attorney, Agent, or Firm* — HP Patent Department

(57) ABSTRACT

According to an example, to repair a disk drive error, a determination is made if a disk field-repair is possible, if an operating system recovery image is available, and if any failed sectors exist in the operating system recovery image. A user is prompted to begin a repair. Failed sectors on the disk drive are read and overwritten, and an operating system recovery is started. In some examples, the disk drive error is an uncorrectable disk drive error.

18 Claims, 3 Drawing Sheets

(56) References Cited

U.S. PATENT DOCUMENTS

| | | | | |
|---|---|---|---|---|
| 2002/0016942 A1* | 2/2002 | MacLaren | ............ | G06F 11/1076 714/718 |
| 2003/0163765 A1* | 8/2003 | Eckardt | .............. | G06F 11/2284 714/36 |
| 2005/0278581 A1* | 12/2005 | Jiang | ................... | G06F 11/2007 714/40 |
| 2006/0179358 A1* | 8/2006 | Cordero | .............. | G06F 11/1441 714/5.11 |
| 2006/0282709 A1* | 12/2006 | Shu | ..................... | G06F 11/0727 714/100 |
| 2007/0047536 A1* | 3/2007 | Scherer | ................. | H04L 49/358 370/360 |
| 2007/0168700 A1* | 7/2007 | Dickenson | .......... | G06F 11/1417 714/5.11 |
| 2008/0155216 A1* | 6/2008 | Shoham | ............. | G06F 11/1417 711/162 |
| 2009/0319806 A1* | 12/2009 | Smith | ................... | G06F 21/575 713/193 |
| 2011/0138166 A1* | 6/2011 | Peszek | ................. | G06F 21/575 713/2 |
| 2012/0134207 A1* | 5/2012 | Yoon | .................... | G11C 11/5642 365/185.03 |
| 2012/0198287 A1* | 8/2012 | Day | ..................... | G06F 11/0727 714/45 |
| 2012/0216075 A1* | 8/2012 | Stakutis | .............. | G06F 11/1417 714/23 |
| 2012/0233497 A1* | 9/2012 | Mori | ................... | G06F 11/073 714/6.11 |
| 2012/0303737 A1* | 11/2012 | Kazar | ................. | G06F 12/0815 709/213 |
| 2013/0047031 A1* | 2/2013 | Tabone | ............... | G06F 11/1417 714/15 |
| 2013/0089257 A1* | 4/2013 | Kim | ...................... | G06T 1/0028 382/170 |

OTHER PUBLICATIONS

Phoenix, "PhoenixBIOS 4.0 Release 6.0" 1997, Phoenix Techonologies, p. 1-4.*

* cited by examiner

DISK DRIVE REPAIR

BACKGROUND

Computing systems, devices, and electronic components in general may be sold or configured with a disk drive, such as a hard disk drive or a solid state drive. Disk drives may be susceptible to hardware-based failures, or failures caused by or related to software, such as read or write errors.

DETAILED DESCRIPTION

Figure 1:
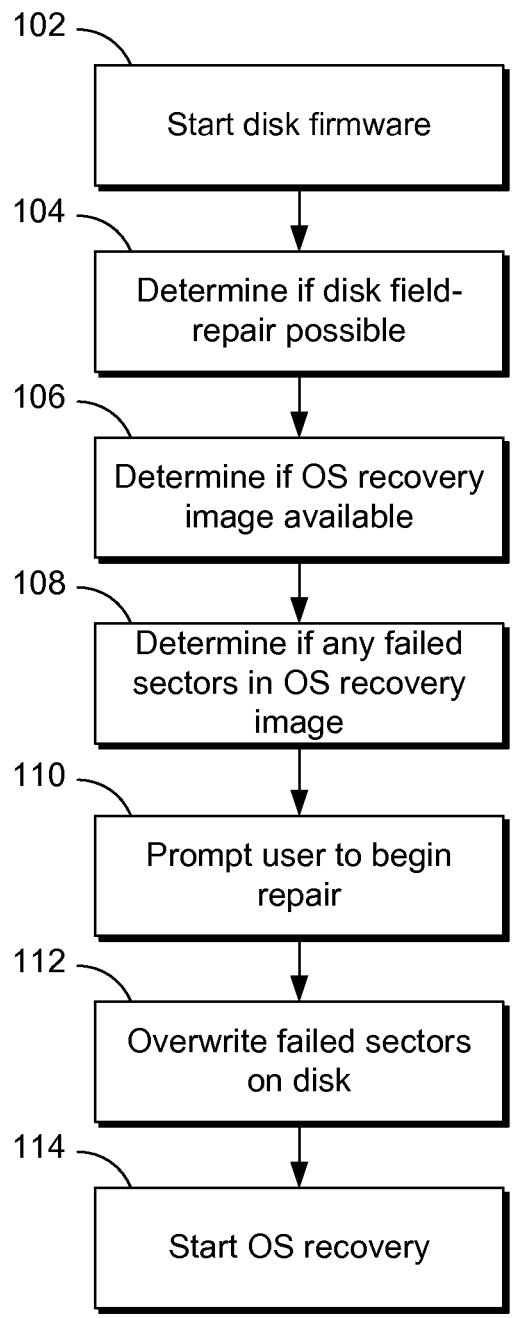
FIG. 1 illustrates a flowchart of repairing a disk drive, according to an example of the present disclosure.

Computing systems, devices, and electronic components such as desktop computers, laptop computers, servers, thin clients, tablets, smartphones, digital video recorders, retail point of sale devices, and other computing equipment (hereinafter "device" or "devices") may comprise a disk drive, such as a hard disk, solid state disk, or other storage device (hereinafter "disk drive" or "disk") capable of storing data for use by the device.

Disk drives may be susceptible to hardware-based failure, or a software-based or "soft" error, such as an uncorrectable read error. Soft errors may be caused by, for example, interference from previous write operations to the disk, incomplete write operations, "off-track" write operations, or other errors. Such errors are not considered hardware errors, but may prevent normal operation of a device such as booting an operating system or accessing data on the disk drive.

In many cases, a soft error may result in a user or customer returning the device or the disk to a manufacturer or repair center. In some cases, the repair center may test the drive, detect a soft error, repair the soft error, and install or re-install the operating system from a recovery partition on the disk, or from a recovery image stored external to the device. In such cases, the customer may wait several days or longer to have the device returned.

In other cases, the repair center may immediately replace the disk and install a new operating system image so that the customer does not need to wait for the testing and repair process. In such cases, the repair center may be replacing the disk unnecessarily, if the error is ultimately found to be a soft error.

In both cases, a user is required to bring or ship a device, or at least a disk drive that must be removed from a device, to a repair center. In both cases, the user must also wait for the repair or replacement process outside of their home or business, in some cases without a backup device. Moreover, the manufacturer or repair center and/or user may be exposed to an unnecessary cost for a "soft" error that could be resolved by the user, without returning a device or drive to the manufacturer or repair center. Further, the need to remove a drive from a device to facilitate a repair further increases the overall cost and frustration involved in the process. For some manufacturers or repairs centers, the number of hard drives received daily may number in the thousands, and repairs costs may reach into the millions of dollars.

According to an example of repairing a disk drive error, a determination is made if a disk field-repair is possible, if an operating system recovery image is available, and if any failed sectors exist in the operating system recovery image. A user is prompted to begin a repair. Failed sectors on the drive are overwritten, and an operating system recovery is started. In some examples, the disk drive error is an uncorrectable disk drive error. In some examples, disk tests may be used to determine if a disk drive is field-repairable, or likely to be field-repairable.

FIG. 1 illustrates a flowchart of repairing a disk drive, according to an example of the present disclosure.

In an example, in block 102, firmware on the disk drive is initialized or started. In some examples, the firmware may be already running from the time the system was booted. In various examples, the system firmware may be a Basic Input Output System ("BIOS") or a firmware, interface, or specification such as the Unified Extensible Firmware Interface, which may be independent to any operating system running on the device. Block 102 may also include detecting an error on the disk drive, or receiving a report of an error from the disk drive, a firmware, or another source.

In block 104, a determination is made as to whether the disk drive error is field-repairable or is likely to be field-repairable. For example, the determination may be that the error is a hardware-based error that requires the drive to be replaced. As other examples, the determination may relate to whether the error is a soft error that can be repaired in the field, or is likely to be field-repairable and/or a successful field repair. The determination of block 104 is discussed in more detail below with respect to FIG. 2.

In block 106, a determination is made as to whether an operating system recovery image is available or accessible. In some examples, block 106 may scan a drive or test to see if the operating system recovery image is stored and accessible in a recovery partition or a particular location on the disk drive itself. In other examples, block 106 may test to see if the operating system recovery image is stored elsewhere on the device, such as on a read-only memory or other chip, or accessible over a network interface, e.g., on a cloud server.

In block 108, a determination is made as to whether the operating system recovery image has any errors, such as failed disk sectors, that may prevent the loading of an operating system recovery image.

In block 110, the user is prompted. In an example, the user may be prompted with a message detailing that an error has been found on the disk drive, and that a determination has been made that the disk may be, or is likely to be, field-repairable. In some examples, the user may be advised of the risk of a field-repair, or the risk of data loss if the device has not been backed up, or backed up in a timely manner. Block 110 may also comprise a backup process.

In some examples, the user may be prompted at other times during the process, such as immediately when an error is first detected, before the determinations of blocks 104, 106, and 108 are made. For example, the user may see a message such as "A data-only error was detected on your Hard Drive. Based upon the type of error detected, it may be possible to repair the data error without the need to replace your hard drive. Would you like to attempt a recovery?"

In block 112, failed sectors on the disk are overwritten. In some examples, the failed sectors may be overwritten with zeroes, or other test data. Block 112 may comprise first reading sectors on the desk, and/or testing the failed sectors after they are overwritten.

In block 114, once all sectors have been read and all failed sectors overwritten, or at least all sectors associated with the operating system, the operating system recovery image is accessed and the operating system recovery is commenced. For example, the operating system recovery image may be copied from the operating system recovery image partition to the working space or partition of the disk drive allocated to running the operating system.

Figure 2:
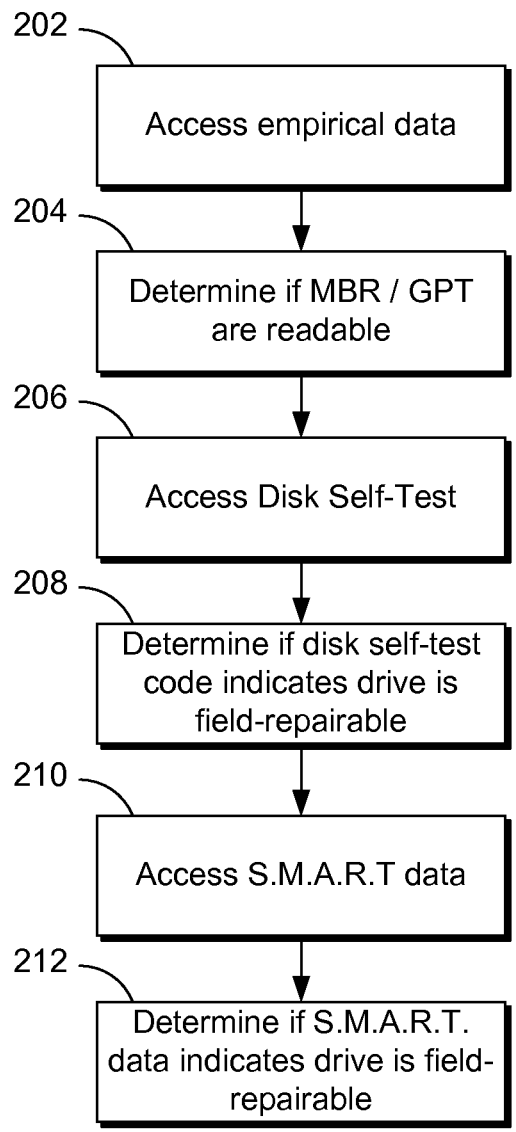
FIG. 2 illustrates a flowchart of determining if a disk field-repair is possible, according to an example of the present disclosure.

FIG. 2 illustrates a flowchart of determining if a disk field-repair is possible, according to an example of the present disclosure.

In block 202, empirical data related to disk drives may be accessed. For example, empirical data related to codes and/or data from disk tools, discussed below in more detail, may be stored on the disk drive, in firmware, or on a remote server that can be accessed to determine if a field-repair is possible, likely to succeed, unlikely to succeed, or certain to fail. The empirical data may be stored or presented in the form of a list of disk codes or disk test data, as opposed to the raw empirical data that would need to be processed on the device. In some examples, the empirical data may be based on disk tool data received from other devices over a historical time period.

In block 204, a determination is made as to whether the master boot record or the globally unique identifier ("GUID") partition table, in some examples, is readable. If block 204 determines that either the boot record or partition table, or other critical boot-related record or table, are not readable, the disk drive may be flagged as unlikely to be field-repairable. In some examples, the flow of FIG. 2 may halt, and the user may be prompted to send the disk to a repair center. In some examples, block 204 may attempt to repair the boot record, if possible.

In block 206, a disk self-test is accessed. The disk self-test may be a tool embedded on the disk drive, a system firmware such as a Basic Input Output System ("BIOS") or a firmware, interface, or specification such as the Unified Extensible Firmware Interface. The disk self-test may return a code or value, which may be checked against a lookup table, e.g., based on empirical data, or otherwise analyzed in block 208 to determine if the error code or value suggests the disk is likely to be field-repairable. For example, a disk self-test code indicating a hardware failure will be flagged as a disk drive not likely or able to be field-repairable. As above, in some examples, the flow of FIG. 2 may halt, and the user may be prompted to send the disk to a repair center.

In block 208, in general, a determination may be made as to whether the error is an uncorrectable read error. An uncorrectable read error, in some cases, may represent a failed sector that cannot be repaired and must be overwritten. For example, if an uncorrectable read error is found in the operating system partition, the failed data may not be able to be recovered or restored such that the operating system can be made functional. In such cases, the entire operating system must be recovered or restored from the operating system recovery image, as discussed above.

In block 210, a disk monitoring system such as the Self-Monitoring, Analysis and Reporting Technology ("SMART") system is accessed. The monitoring tool may also be a tool embedded on the disk drive, a system firmware such as a Basic Input Output System ("BIOS") or a firmware, interface, or specification such as the Unified Extensible Firmware Interface. As with the disk self-test, the monitoring tool may return a code or value, which may be checked against a lookup table or otherwise analyzed in block 212 to determine if the error code or value suggests the disk is likely to be field-repairable.

For example, a SMART code indicating a hardware failure, such as an attribute of 197 with a raw value of 0 or 1, will be flagged as a disk drive not likely or able to be field-repairable. Other attributes may be checked, such as whether a drive is configured for distributed storage or RAID; whether a drive is encrypted; or whether a drive is a solid state disk, which may influence the likelihood of a successful field-repair. As above, in some examples, the flow of FIG. 2 may halt, and the user may be prompted to send the disk to a repair center.

Figure 3:
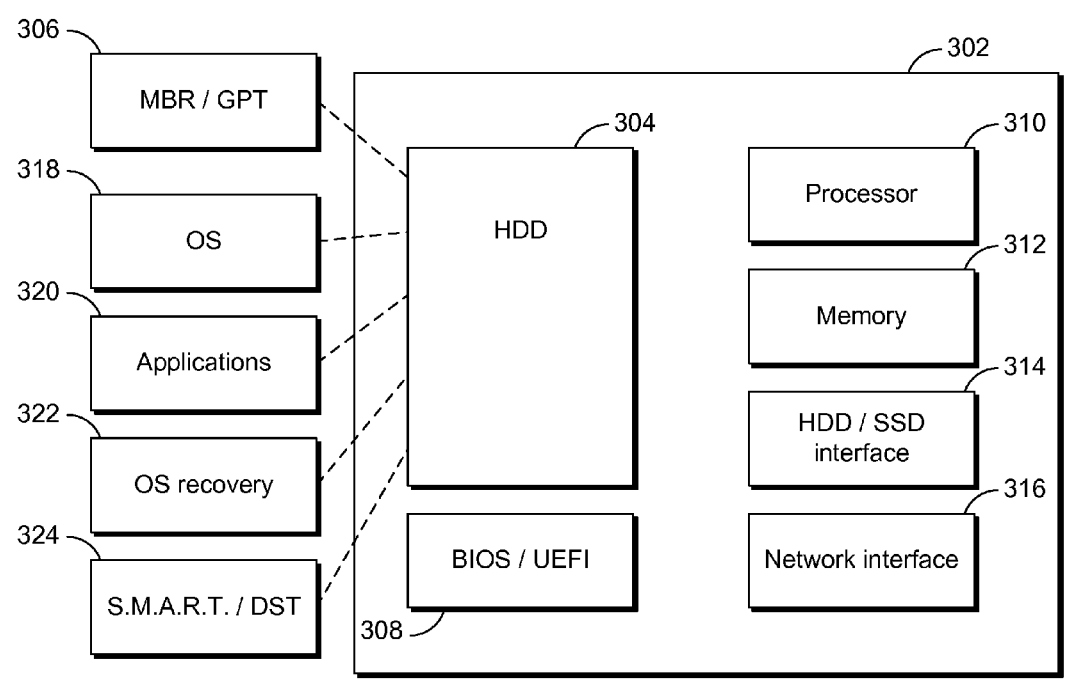
FIG. 3 illustrates a schematic representation of a computing device that may be used as a platform for implementing or executing at least one of the processes depicted in FIGS. 1-2 according to an example of the present disclosure.

FIG. 3 illustrates a schematic representation of a computing device that may be used as a platform for implementing or executing at least one of the processes depicted in FIGS. 1-2 according to an example of the present disclosure.

In an example, device 300 comprises a disk drive 304, a BIOS or UEFI 308, a processor or CPU 310, a memory 312, a disk drive interface 314, and a network interface 316. The disk drive 304, processor or CPU 310, memory 312, disk drive interface 314, and a network interface 316 may be coupled by a bus or other interconnect. In some examples, device 300 may also comprise a computer readable medium that may comprise an operating system 318, applications 320, operating system recovery image or partition 322, and disk self-test tools or monitoring tools such as SMART 314. Disk drive 304 may also comprise a master boot record or partition table 306.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats. The computer readable medium may also store other machine-readable instructions, including instructions downloaded from a network or the internet.

The computer-readable medium may also store a firmware that may perform basic tasks such as recognizing input from input devices, such as a keyboard or a keypad; sending output to a display; keeping track of files and directories on a computer readable medium; controlling peripheral devices, such as drives, printers, or image capture devices; and managing traffic on a bus. The network applications may include various components for establishing and maintaining network connections, such as machine readable instructions for implementing communication protocols including but not limited to TCP/IP, HTTP, HTTPS, Ethernet, USB, and FireWire.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:
1. A method comprising:
   detecting, in a computing device, an error of a disk drive, wherein the error is an uncorrectable read error that corresponds to failed sectors on the disk drive;
   in response to the detecting, determining, by the computing device, whether a disk drive field-repair is possible;

in response to determining that the disk drive field-repair is not possible, halting, by the computing device, a process of recovering from the error of the disk drive;
in response to determining that the disk drive field-repair is possible, the computing device:
determining if an operating system recovery image is available;
determining if any failed sectors exist in the operating system recovery image;
prompting a user to begin a repair on the computing device;
overwriting the failed sectors on the disk drive;
starting an operating system recovery on the computing device; and
using the operating system recovery image to perform the operating system recovery in response to determining that the error is an uncorrectable read error.

2. The method according to claim 1, wherein determining whether the disk field-repair is possible comprises:
determining whether a boot record is readable;
in response to determining that the boot record is not readable, indicating that the disk drive field-repair is not possible; and
in response to determining that the boot record is readable, indicating that the disk drive field-repair is possible.

3. The method according to claim 2, wherein the boot record is a master boot record.

4. The method according to claim 2, wherein the boot record is a globally unique identifier partition table.

5. The method according to claim 2, further comprising:
performing a test of the disk drive;
determining, based on a code returned in response to the test, whether the error is a hardware failure;
in response to determining that the error is a hardware failure, indicating that the disk drive field-repair is not possible.

6. The method according to claim 1, wherein determining if the operating system recovery image is available comprises accessing a disk drive recovery partition.

7. The method according to claim 1, wherein determining if any failed sectors exist in the operating system recovery image comprises scanning a disk drive recovery partition.

8. A computing device comprising:
a disk drive; and
a processor;
wherein the disk drive comprises an operating system and an operating system recovery partition, and wherein the processor is to:
detect a disk drive error,
in response to the detecting, determine whether the disk drive is field-repairable, wherein the processor is to determine whether the disk drive is field-repairable by determining whether a boot record is readable, and in response to determining that the boot record is not readable, indicating that the disk drive is not field-repairable,
in response to determining that the disk drive is not field-repairable, halt a process of recovering from the disk drive error,
in response to determining that the disk drive is field-repairable:
determine if an operating system recovery image is available and whether any failed sectors exist in the operating system recovery image,
overwrite failed sectors on the disk drive, and
start an operating system recovery to repair the disk drive.

9. The computing device according to claim 8, further comprising a system firmware executable on the processor to detect the disk drive error.

10. The computing device according to claim 8, further comprising a network interface to access a network operating system recovery image.

11. The computing device according to claim 8, further comprising a disk tool to perform a test of the disk drive, the processor to further:
determine, based on a code returned in response to the test, whether the disk drive error is a hardware failure,
in response to determining that the disk drive error is a hardware failure, indicate that the disk drive is not field-repairable.

12. The computing device according to claim 11, wherein the disk tool comprises a Self-Monitoring, Analysis and Reporting Technology system.

13. A non-transitory computer readable storage medium storing instructions that upon execution cause a system to:
detect an error of a storage device;
determine whether the error is likely to be field-repairable, wherein the determining of whether the storage device is field-repairable comprises determining whether a boot record is readable, and in response to determining that the boot record is not readable, indicating that the storage device is not field-repairable;
in response to determining that the error is likely not to be field-repairable, halt a process of recovering from the error of the storage device;
in response to determining that the error is likely to be field-repairable:
determine if an operating system recovery image is available;
overwrite failed sectors on the storage device; and
start an operating system recovery using the operating system recovery image.

14. The non-transitory computer readable storage medium according to claim 13, wherein the instructions upon execution cause the system to perform a test of the storage device, and compare a result of the test with a lookup table based on empirical data to determine whether the error is likely to be field-repairable, wherein the empirical data is based on historical disk tool data from other devices.

15. The method according to claim 5, further comprising:
in response to determining based on the code that the error is a soft error, indicating that the disk drive field-repair is possible.

16. The method according to claim 1, further comprising determining that the operating system recovery image is not loadable in response to determining that at least one failed sector exists in the operating system recovery image.

17. The method according to claim 1, wherein prompting the user is performed in response to detecting the error.

18. The computing device according to claim 8, wherein the processor is to determine whether the disk drive is field-repairable by further:
performing a test of the disk drive;
determining, based on a code returned in response to the test, whether the error is a hardware failure;
in response to determining that the error is a hardware failure, indicating that the disk drive is not field-repairable.

* * * * *